June 3, 1930.  J. L. DRAKE  1,761,198
PROCESS OF DRAWING SHEET GLASS
Filed June 21, 1926

Inventor
John L Drake
By Frank Fraser
Attorney

Patented June 3, 1930

1,761,198

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

PROCESS OF DRAWING SHEET GLASS

Application filed June 21, 1926. Serial No. 117,281.

The present invention relates to sheet glass drawing apparatus.

An important object of the invention is to provide an improved process and apparatus for drawing any desired thickness of sheet from a mass of molten glass.

Another object of the invention is to provide an apparatus wherein a sheet of glass may be continuously drawn from a mass of molten glass, the apparatus including adjustable means for facilitating the formation of any desired thickness of sheet.

Still another object of the invention is to provide an apparatus of this nature wherein an adjustable roll is arranged above a mass of molten glass and over which a sheet of glass may be drawn and deflected, the roll being adjustable so that it may be raised or lowered depending upon the thickness of sheet desired.

A still further object of the invention is to provide an apparatus including an adjustable rotatable roll arranged above the mass of molten glass and over which a sheet may be continuously drawn and deflected, the roll being arranged relatively close to the surface of the molten glass when a thick sheet is desired, and moved relatively a substantial distance from the surface of said glass when a relatively thin sheet is desired.

Other objects and advantages of the invention will become apparent during the course of the following description.

Figure 1:
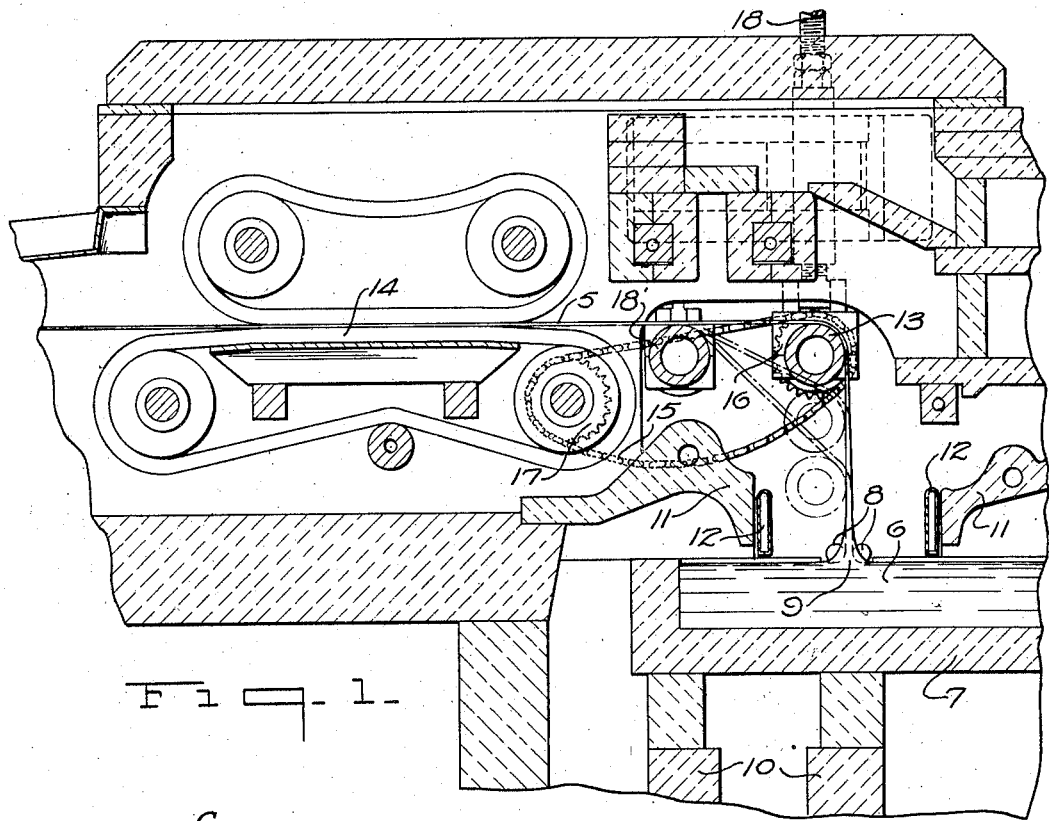
Figures 2, 3:
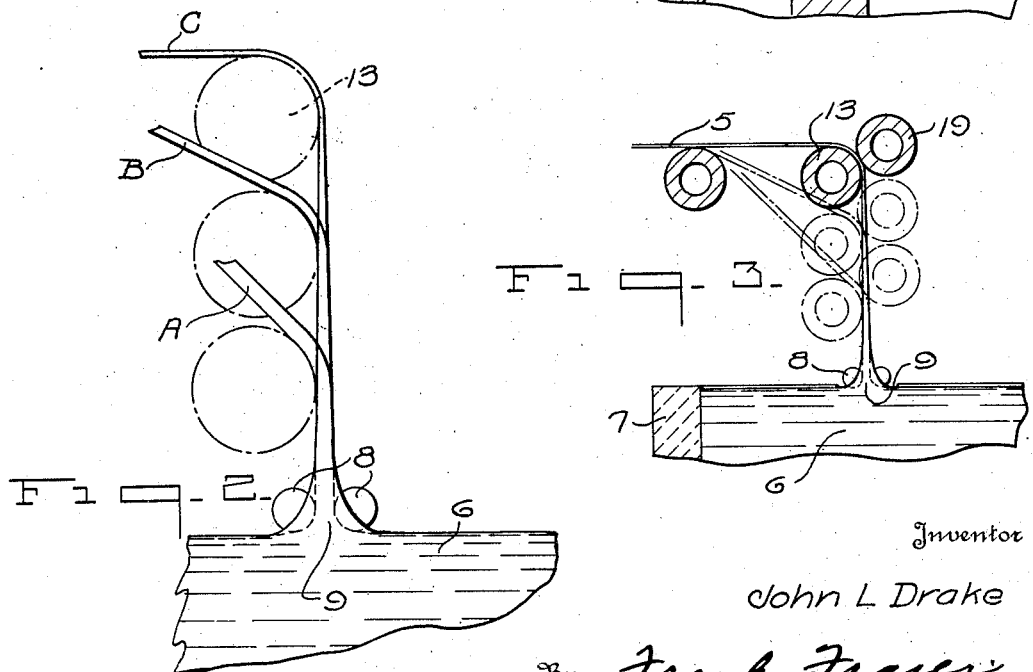

In the drawings wherein like numerals are employed to designate like parts throughout the same, Fig. 1 is a fragmentary vertical longitudinal section illustrating my improved construction, Fig. 2 is a diagrammatic view of the sheet forming portion, and Fig. 3 is a similar view of a slightly modified form of construction.

The present invention is illustrated in conjunction with the type of machine illustrated in the Colburn Patent No. 1,248,809, granted December 4, 1917, although it is to be understood that the invention is not necessarily restricted in its use to such apparatus. In the production of sheet glass with the Colburn apparatus, a sheet of glass 5, illustrated in Fig. 1, is continuously drawn from a mass of molten glass 6 contained in a draw pot 7. Rotatable knurls 8 are arranged at the base or meniscus 9 of the sheet to prevent narrowing thereof during the drawing operation. The pot 7 is usually supported upon stools 10 arranged in a suitable chamber provided with heating means which assist in maintaining the molten mass 6 at the proper working temperature.

Arranged above the molten surface and in spaced relation thereto are lip tiles 11 and lip tile coolers 12. The tiles and coolers protect the sheet 5 in its vertical run from gases and heat present around the tank and furnace. As is clearly shown in Fig. 1, the coolers 12 are arranged relatively far away from the sheet so that there is an exposure to the atmosphere of the glass between the coolers and the meniscus 9.

The sheet 5 is drawn vertically a substantial distance, after which it is deflected over a bending roll 13, permitting the sheet to be run in a horizontal plane over a draw table and flattening table 14 and on through an annealing leer, after which the sheet may be cut into the desired lengths.

There are numerous thicknesses of sheets of glass desired, such as one-eighth inch, three-sixteenths inch, one-quarter inch thickness, etc.

Heretofore, on the Colburn machine, the thickness of sheet produced has been controlled by the temperature of the glass in the pot and the speed at which the draw table 14 and associated parts are run. Thus for the thin glass, such as one-eighth inch, the speed of production is considerably greater than the speed of production of the thicker glass such as three-sixteenths, or one-quarter inch. I have observed that the glass is relatively much thicker at its base or meniscus 9 than it is in finished form. I have also observed that the sheet in its vertical run presents a tapered cross sectional view such as clearly illustrated in Fig. 2. The glass from the pot to the bending roll is under a tension, and as it is plastic is subject to stretching which causes an attenuation from a relatively thick sheet at its bottom to a relatively thin sheet at the bending roll. I have also observed that the thickness of the sheet at the base for instance is considerably greater in the production of the thicker sheets than in the production of the thinner sheets when the position of the roll 13 remains constant. The time required to build up this thicker sheet and the speed at which it is drawn make it impossible to produce the same number of square feet in the same length of time for all thicknesses.

In the present invention the bending roll 13 is preferably positively driven by means of a sprocket chain 15 trained about a sprocket 16 carried by the bending roll 13, and a sprocket 17 associated with one of the driving drums of the draw table 14.

The roll 13 is adjustably mounted and may be carried by an adjustable shaft 18 so that the roll may be raised or lowered with respect to the surface of the molten glass 6.

In Fig. 2 is shown diagrammatically how the bending member 13 may be adjusted to produce the various thicknesses of sheets of glass. The bending member 13 is shown diagrammatically in three positions, the lower position showing the production of a relatively thick sheet of glass A, the intermediate position showing the production of a slightly thinner sheet of glass B, while the highest position produces the thinnest sheet of glass C. It will, of course, be understood that there are more than three thicknesses of sheet glass produced, but the diagrammatic view clearly shows how the bending member 13 is adjusted to control the thickness of glass.

In fact, what is done to control the thickness of sheet produced, is to drop the bending roll from its highest position to a position where the tapered sheet is of the desired thickness. For instance, when the sheet lettered "C" is being produced, the vertical run of the sheet is tapered. Somewhere between the surface of the molten glass 6 and the bending roll 13 when it is in its highest position, the tapered portion of the sheet in the vertical run is just the proper thickness for the one-quarter inch glass. Slightly higher up the tapered sheet the proper thickness may be found for the three-sixteenths inch glass, etc.

By dropping the roll to the various portions any of the desired thicknesses may be easily formed without increasing to any material extent, at least, the relative thickness of the sheet at its base.

The sheets are deflected over the bending member 13, and when the heavier sheets are being produced may be deflected a second time over a second roll 18.

In Fig. 3, in addition to the bending roll, a supplementary roll 19 is shown which flattens out any irregularities present in the sheet. The supplementary roll is preferably adjustable with the bending roll as a unit, and of course means are provided for controlling the gap between the bending roll and supplementary roll to take care of the different thicknesses of sheet produced.

In view of the fact that the bending roll is moved toward and away from the supply glass to take care of the different thicknesses desired, and as the base of the sheet is substantially the same thickness in all cases, the thicker sheets of glass can be produced more rapidly than when the position of the bending roll is fixed. Any variations in the thickness of the sheet base can be compensated for by an adjustment of the roll, thus making it possible to produce a uniform sheet of glass of a predetermined thickness.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing sheet glass from a mass of molten glass, consisting in drawing a tapered sheet therefrom, and then contacting with and deflecting the sheet at that point which will give the desired thickness.

2. The process of producing sheet glass from a mass of molten glass, consisting in drawing a tapered sheet therefrom, and then contacting with and deflecting said sheet at that point which will give the desired thickness of finished sheet, the point of contact varying with different thicknesses of sheet produced.

3. The process of producing sheet glass from a mass of molten glass, consisting in drawing a tapered sheet therefrom, and then contacting with and deflecting said sheet at that point which will give the desired thickness of finished sheet, the point of contact varying with different thicknesses of sheet produced, while the thickness of the base of the sheet remains practically the same thickness in all cases.

4. The process of producing sheet glass from a mass of molten glass, consisting in drawing a tapered sheet therefrom, and then contacting with and deflecting said sheet at that point which will give the desired thickness of finished sheet, the point of contact varying with different thicknesses of sheet produced, and flattening the sheet as it is being deflected.

5. The process of producing sheet glass from a mass of molten glass, consisting in drawing a sheet therefrom and then deflecting said sheet into a plane different from the plane in which it is drawn, and arranging the deflecting means relatively close to the mass of molten glass to produce a thick sheet and relatively far away from said molten glass to produce a relatively thin sheet.

6. The process of producing sheet glass from a mass of molten glass, consisting in drawing a tapered sheet therefrom, and then contacting with and deflecting the sheet into a plane different from the plane in which the sheet is drawn, said deflecting means being arranged relatively close to the molten mass when a relatively thick sheet is desired and relatively far away therefrom when a relatively thin sheet is desired.

Signed at Toledo, in the county of Lucas and State of Ohio, this 18th day of June, 1926.

JOHN L. DRAKE.